United States Patent
Melo et al.

(10) Patent No.: US 12,300,014 B2
(45) Date of Patent: May 13, 2025

(54) GUEST MEASUREMENT SYSTEMS AND METHODS

(71) Applicant: Universal City Studios LLC, Universal City, CA (US)

(72) Inventors: Anthony Melo, Orlando, FL (US); Julia Ann Javorsky, Hinckley, OH (US); Logan Bender, Orlando, FL (US); Angelo Pagliuca, Orlando, FL (US); Dionté Omar Henderson, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 279 days.

(21) Appl. No.: 17/835,741

(22) Filed: Jun. 8, 2022

(65) Prior Publication Data

US 2023/0401881 A1    Dec. 14, 2023

(51) Int. Cl.
| | |
|---|---|
| *G06V 40/10* | (2022.01) |
| *A63G 31/00* | (2006.01) |
| *G06T 3/40* | (2024.01) |
| *G06T 7/60* | (2017.01) |
| *G06T 7/73* | (2017.01) |
| *G06V 10/74* | (2022.01) |

(52) U.S. Cl.
CPC ............... *G06V 40/10* (2022.01); *G06T 3/40* (2013.01); *G06T 7/60* (2013.01); *G06T 7/73* (2017.01); *G06V 10/761* (2022.01); *A63G 31/00* (2013.01); *G06T 2200/24* (2013.01); *G06T 2207/30196* (2013.01); *G06T 2207/30204* (2013.01)

(58) Field of Classification Search
CPC .... G06V 40/10; G06V 10/761; G06V 40/103; G06V 20/52; G06T 3/40; G06T 7/60; G06T 7/73; G06T 2200/24; G06T 2207/30196; G06T 2207/30204; A63G 31/00
See application file for complete search history.

(56) References Cited

U.S. PATENT DOCUMENTS

| | | | |
|---|---|---|---|
| 8,976,237 B2 | 3/2015 | Cheng et al. | |
| 10,504,230 B1* | 12/2019 | Stahl | .................... G06Q 10/087 |
| 10,729,985 B2 | 8/2020 | Stenzler et al. | |

(Continued)

FOREIGN PATENT DOCUMENTS

| | | |
|---|---|---|
| JP | 2016185275 A | 10/2016 |
| WO | 2021084687 A1 | 5/2021 |

OTHER PUBLICATIONS

Criminisi, Antonio et al.; "A New Approach to Obtain Height Measurements from Video," Proceedings of SPIE—The International Society for Optical Engineering, Jan. 2022.

(Continued)

*Primary Examiner* — Jianxun Yang
(74) *Attorney, Agent, or Firm* — Fletcher Yoder, PC

(57) ABSTRACT

A guest measurement system includes a controller configured to receive image data indicative of guest characteristics. The controller includes a processor configured to identify one or more anatomical features of the guest and the reference marker in the image data and scale distances between the identified anatomical features in the image data from a virtual space of the image data to a real-world space using the reference marker in the image data. Based on the scaled distances, the system can generate a guest height calculation.

20 Claims, 8 Drawing Sheets

(56) References Cited

U.S. PATENT DOCUMENTS

| | | | | |
|---|---|---|---|---|
| 2016/0307354 A1* | 10/2016 | Baur | ................. | G06T 13/40 |
| 2019/0143228 A1* | 5/2019 | Stenzler | ................. | G06V 20/52 |
| | | | | 700/90 |
| 2022/0198696 A1* | 6/2022 | Jones | ................. | G06T 7/62 |
| 2024/0087353 A1* | 3/2024 | Yoshida | ................. | G06T 7/74 |

OTHER PUBLICATIONS

Ljungberg, Jenny et al.; "Estimation of human height from surveillance camera footage—a reliability study," School of Health Science, Jönköping University Department of Rehabilitation, May 2008.
PCT/US2023/024727 International Search Report and Written Opinion mailed Aug. 253, 2023.

* cited by examiner

GUEST MEASUREMENT SYSTEMS AND METHODS

BACKGROUND

The present disclosure relates generally to the field of amusement parks. More specifically, embodiments of the present disclosure relate to methods and equipment utilized to measure guests in an amusement park to assess one or more physical characteristics and/or determine eligibility to enter an attraction of the amusement park, e.g., enter an amusement ride as a passenger.

Theme or amusement parks have become increasingly popular. More sophisticated and creative ride attractions have been helpful in increasing the popularity and success of such parks. Certain attractions may be height-restricted to passengers that are above a height threshold. For example, theme park ride attractions may involve ride vehicles, such as roller coaster type cars, or other vehicles that move along a ride path. Height restrictions for a ride may involve restricting the ride to passengers within a particular height range that can be fitted to the restraints of each seat. The passengers can be measured before entering the ride to determine if they fit within the height restrictions. For example, a passenger can manually compare their height to a line on the wall.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a guest measurement system is provided that includes one or more cameras configured to generate image data indicative of guest characteristics in an attraction measurement area of an individual attraction within an amusement park, wherein the image data comprises an image of a reference marker in the attraction measurement area. The guest measurement system also includes a controller configured to receive the image data indicative of the guest characteristics from the one or more cameras. The controller includes a processor that is configured to identify one or more anatomical features of the guest in the image data; identify the reference marker in the image data; scale distances between the identified anatomical features in the image data from a virtual space of the image data to a real-world space using the reference marker in the image data; and generate a guest height calculation based on the scaled distances between the identified anatomical features.

In accordance with an embodiment, method of measuring a guest in an attraction measurement area is provided that includes receiving image data indicative of guest characteristics from one or more cameras; identifying one or more anatomical features of the guest in the image data; identifying a reference marker in the image data; scaling distances between the identified anatomical features in the image data from a virtual space of the image data to a real-world space using the reference marker in the image data; and generating a guest height calculation based on the scaled distances between the identified anatomical features.

In accordance with one embodiment, a guest measurement device is provided that includes one or more cameras configured to generate sensor signals comprising image data indicative of guest characteristics in an attraction measurement area of an individual attraction within an amusement park. The guest measurement device also includes a controller configured to receive the sensor signals indicative of the guest characteristics from the one or more cameras. The controller includes a processor that is configured to identify one or more anatomical features of the guest in the image data; identify a reference marker in the image data; scale distances between the identified anatomical features in the image data from a virtual space of the image data to a real-world space using the reference marker in the image data; and generate a guest height calculation based on the scaled distances between the identified anatomical features. The guest measurement device also includes a display configured to display an indication of the guest height calculation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Presently disclosed embodiments facilitate attraction measurement techniques for measuring one or more guest characteristics that in turn may be used to determine eligibility of the guest to enter a height-restricted attraction. The measurement techniques permit guests to be measured while in a variety of positions, e.g., standing, seated, slouching, or leaning over. Further, the measurement techniques reduce user measurement error or confusion associated with attraction eligibility requirements.

Figure 1:
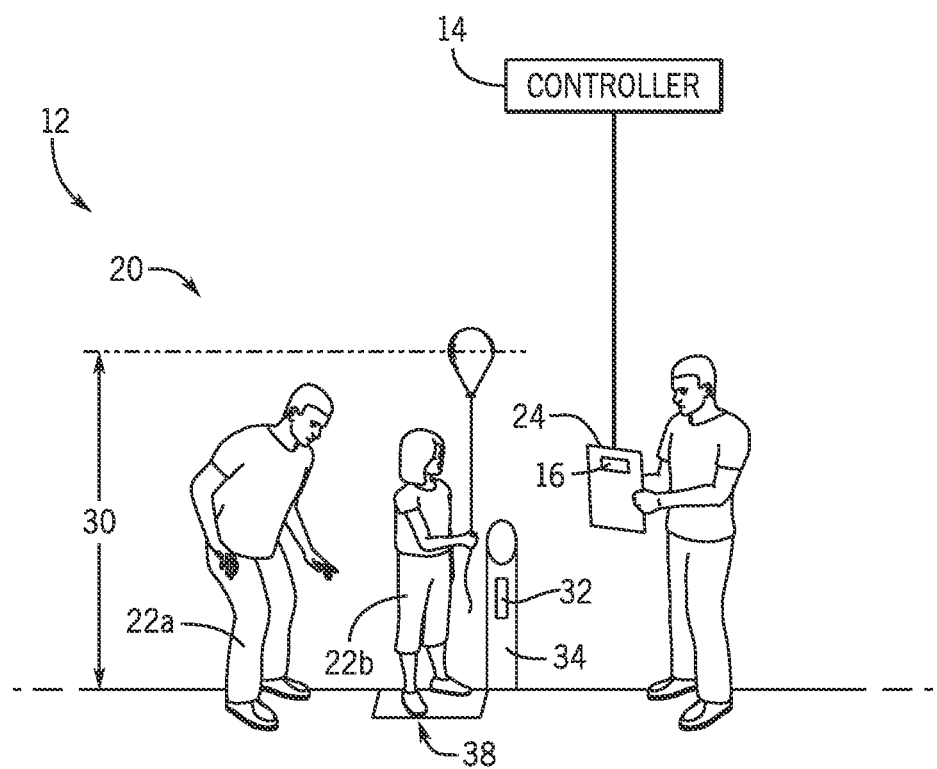
FIG. 1 is a schematic view of a guest measurement system in operation in an amusement park in accordance with present embodiments.

FIG. 1 shows an example guest measurement system 12 that includes a controller 14 coupled to one or more cameras 16 that generate image data in a guest measurement area 20 of an attraction. The image data, in turn, is used to generate guest measurements by mapping the virtual world image data into real-world space such that relative virtual distances between anatomical features in the image data are used to estimate guest measurements.

The one or more cameras 16 that capture the image data are coupled to or housed in a guest measurement device 24. The guest measurement device 24 is a portable, hand-held device containing the one or more cameras 16 in order to obtain measurements by moving the hand-held device in front of the guest to obtain relevant data. In one embodiment, the guest measurement device 24 containing the one or more cameras 16 is hand-held mobile device or tablet. In an embodiment, the guest measurement device 24 may be coupled to a kiosk or fixed-position housing.

The one or more cameras 16 may also obtain image data that includes a reference marker 32 disposed along an axis of a plane in the measurement area 20 and that is used to map the virtual space into the real world. In the illustrated example, the reference marker is disposed on a wall or post 34 that is positioned at an appropriate location within the measurement area 20 such that the guest is appropriately positioned to intersect a plane of the reference marker 32. The guest measurement system 12 may include a position marker 38 to correctly position the guest relative to the reference marker 32. Where the guest measurement device 24 is portable or at least partially adjustable, the guest measurement device 24 can be oriented or repositioned to capture both the guest and the reference marker 32 within a field of view of the camera 16.

The reference marker 32 may be a QR code, an image (e.g., a 2D image), a printed or formed shape, or other image-resolvable feature of fixed size or dimensions. Based on a relationship between features of the reference marker 32 in the image data and known real-world measurements of the feature of the reference marker 32, anatomical features of the guests can be mapped to real-world space from the virtual space.

The one or more cameras 16 collect image data that includes image data representative of one or more guests, illustrated as a first guest 22a and a second guest 22b in FIG. 1. The image data is provided to a controller 14, which uses the image data to determine a guest characteristic, such as height. The guest measurement system 12 permits guests to be accurately measured while leaning over or seated, e.g., in a wheelchair or a stroller. As shown by way of example, the first guest 22a is taller than the second guest 22b. However, the first guest 22a is leaning over, while the second guest 22b is holding a balloon. If a distance 30 from the ground represents the minimum height to ride an attraction, an optical beam type sensor that measures beam disruptions at the minimum height would mistakenly indicate the second guest 22b as being tall enough, because the balloon would break the beam. Further, the first guest 22a would also be incorrectly identified as being not tall enough. In contrast, the disclosed measurement system 12 as provided herein would correctly identify the first guest 22a as being tall enough and the second guest 22b as not being at least the minimum height. The system 12 uses sensor signals to identify anatomical features and generate a height calculation based on estimated dimensions or distances between of the anatomical features. In embodiments, the system 12 may provide a display or other indicator to indicate qualifying or not qualifying height calculations.

Figure 2:
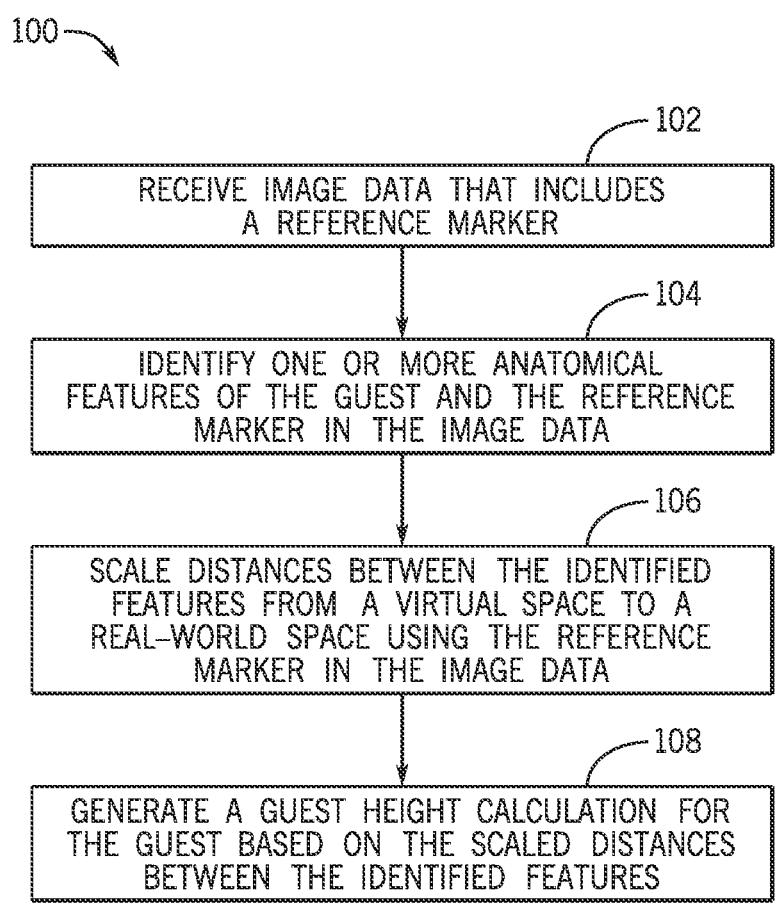
FIG. 2 is a flow diagram of a method using a guest measurement system in accordance with present embodiments.

In an embodiment, using the information obtained via the one or more cameras 16, one or more guest features are identified. With the foregoing in mind, FIG. 2 is a flow diagram of a method 100 using a guest measurement system in accordance with present techniques. The method 100 includes receiving (block 102) image data indicative of guest characteristics from one or more cameras 16 disposed in a measurement area 20. In an embodiment, the measurement area 20 can be at an amusement park entrance, at a guest services center, or at an individual attraction. In an embodiment, a guest measurement event can take place once, and the system 12 stores the determined guest measurements and provides the guest measurements to be validated for different attractions. Thus, the guest 22 can be measured only once for a variety of attractions.

The method 100 includes detecting (block 104) anatomical features, e.g., one or based on the image data. It may be appreciated that the image data may first be filtered, normalized, calibrated, and/or pre-processed to be used more readily with a height calculation logic as provided herein. A presence and a position of various limbs and/or anatomical features of the guest, including the guest's head, neck, torso, pelvis, thigh, knee, calf, shin, ankle, foot, toe, hand, wrist, finger, elbow, forearm, and so forth may be identified or detected based on the image data. The image data also includes the reference marker 32, and the method 100 also identifies the reference marker 32 within the image. The reference marker 32 can be selected to be quickly and easily identified and distinguished from other real-world features captured in the image data. In an embodiment, the reference marker 32 may be imaged in the visible spectrum and/or may be imaged outside of the visible spectrum. Thus, the image data may include data from a visible light camera (e.g., an RGB camera) and a fluorescent or infrared camera.

The distances between two or more different identified anatomical features are scaled (block 106) from a virtual space to a real-world space using the reference marker 32 as generally discussed herein. In an embodiment, the techniques may be used to identify a limb difference, such as an amputation and the length of identified amputation. Based on stored attraction information, a notification can be generated for one or more attractions of attractions within an amusement park that the guest is eligible to ride.

The method 100 includes generating a guest height calculation (block 108) based on the scaled distances. The estimated dimensions may include a length estimate between joints (e.g., wrist-to-elbow; elbow-to-shoulder, ankle-to-knee, knee-to-hip) and/or a width estimate in a plane parallel to a length axis. By using the method described herein, the guest may be measured to determine whether he can enter the ride without having to stand up from a wheelchair, assisted mobility device, stroller, and so forth. Further, it may be appreciated that the techniques described herein may also be applied to a guest that does not have any movement restrictions.

The guest features may be an anatomical feature, e.g., each of the guest's limbs are identified. The guest's head, neck, torso, pelvis, arms, knees, shins, ankles, feet, hands, toes, fingers, and so forth may be identified. It may be appreciated that some of these limbs may have a paired limb or corresponding limb across a medial axis of the guest's body (i.e., a right limb and a left limb). The presently disclosed embodiments include identifying virtual space distances between identified anatomical features and scaling these measurements to the real world. The total height of the guest may be estimated or calculated using stored relationships between height and these distances. In an embodiment, scaled distances between a top of shoulder and a top of head, a top of shoulder to waist, and/or a waist to floor or foot can be used to determine guest height. The presently disclosed embodiments include generating an overall height calculation of the guest based on the identified distances in image data (e.g., virtual space) that are scaled to real-world space using features of the reference marker 32 as a scaling factor. In this way, the guest may remain seated (e.g., in a wheelchair) while being measured prior to accessing the ride.

Figure 3:
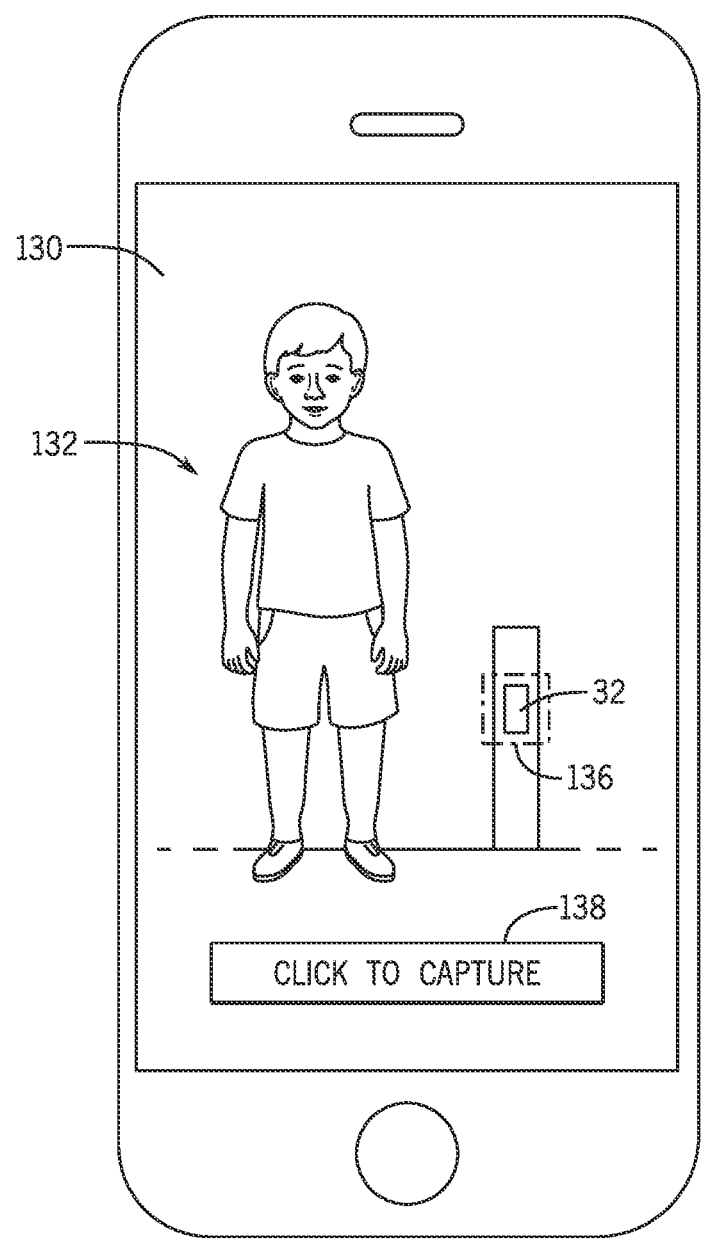
FIG. 3 is an example user interface of a guest measurement system in accordance with present embodiments.

FIG. 3 is an example user interface 130 of the guest measurement system 12 showing a camera feed 132 displayed via the user interface 130. The user interface 130 may include a box or other marker 136 overlaid on the camera feed 132 indicating an appropriate position of the reference marker 32. In an embodiment, an operator can open a guest measurement application operating on a hand-held device to activate the cameras. The cameras capture a real-time camera feed 132 that is displayed. In an embodiment, the user interface 130 also includes a clickable key 138. In an embodiment, the clickable key 138 defaults to an inactive state but is activated only when the reference marker 32 is appropriately positioned to trigger display of the clickable key 138 or to trigger activation of the clickable key 138 on the user interface 130. The user interface 130 may, in embodiments, additionally or alternatively include an overlaid marker to guide guest positioning at an appropriate location in the camera feed 132 relative to the reference marker 32. When the operator determines that the guest is appropriately positioned, the operator can provide a user input via the clickable key to capture image data, e.g., a still image, used for the guest height calculation as discussed herein. In embodiments, any overlaid markers on the user interface 130 are not included in the captured still image.

Figure 4:
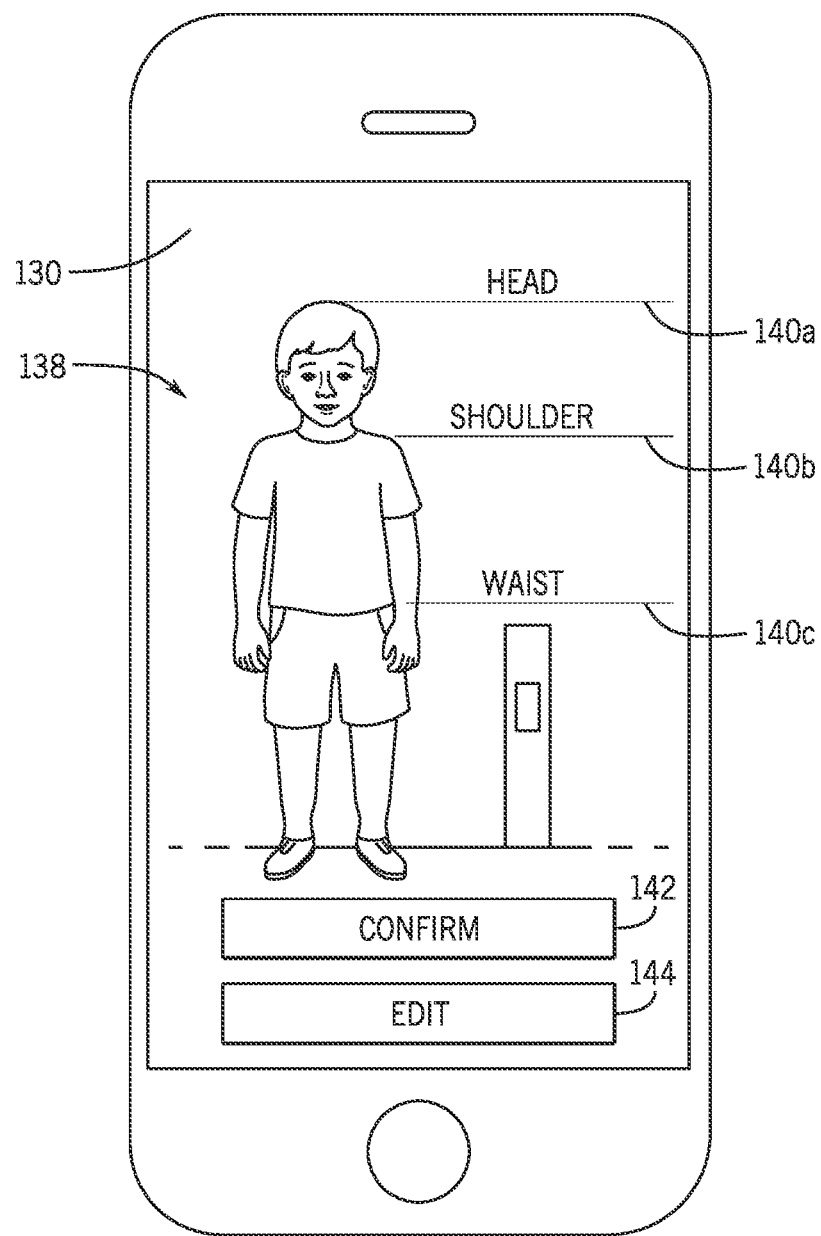
FIG. 4 is an example user interface of a guest measurement system in accordance with present embodiments.

FIG. 4 shows the captured still image 138 used for the guest height calculation displayed on the user interface 130. Accordingly, the user interface 130 of FIG. 3 may transition to the user interface 130 of FIG. 4 during operation. After the image data is captured, the system 12 uses the image data of the captured still image 139 to generate one or more anatomical feature markers 140 that are overlaid on the captured still image 138. The anatomical feature markers are generated based on anatomical feature recognition performed on the image data. For example, the system 12 may use a trained neural network to identify one or more of a head, eyes, mouth, nose, eyebrows, shoulders, limbs, waist, hands, feet, etc. The guest measurement area 20 may be maintained with white or plain surroundings so that the captured still image 138 is free of other features that may generate false positives. Thus, the captured still image 138 can, in embodiments, only include the reference marker 32 and the guest 22 as object in the image, which can render anatomical feature recognition more computationally efficient.

In an embodiment, the system 12 completes an initial anatomical feature recognition using the captured still image. In the illustrated embodiment, the user interface 130 includes three different anatomical feature markers 140: a top of head marker 140a, a shoulder marker 140b, and a waist marker 140c. The anatomical feature markers 140 are overlaid on the captured still image 138 at locations that correspond to the respective identified anatomical features. In the illustrated embodiment, the anatomical feature markers 140 are text-labeled lines that intersect or pass through their corresponding identified anatomical features. However, it should be understood that other graphical indicators, shapes, or configurations are also contemplated. For example, the identified anatomical features may be marked with highlighting, shading, boxes, etc.

To account for variability in guest clothing, hats, hairstyles, and posture, the system 12 may permit operator input to confirm that the anatomical feature markers 140 are correctly positioned before proceeding with the guest height calculation based on these identified anatomical features. In the illustrated example, anatomical feature markers 140 appear to generally correspond with the correct locations, and the user can click or activate the confirm key 142. However, if one or more of the anatomical feature markers 140 are incorrectly located, the user can click the edit key 144 to manually change the location or locations of the anatomical feature markers 140.

Figure 5:
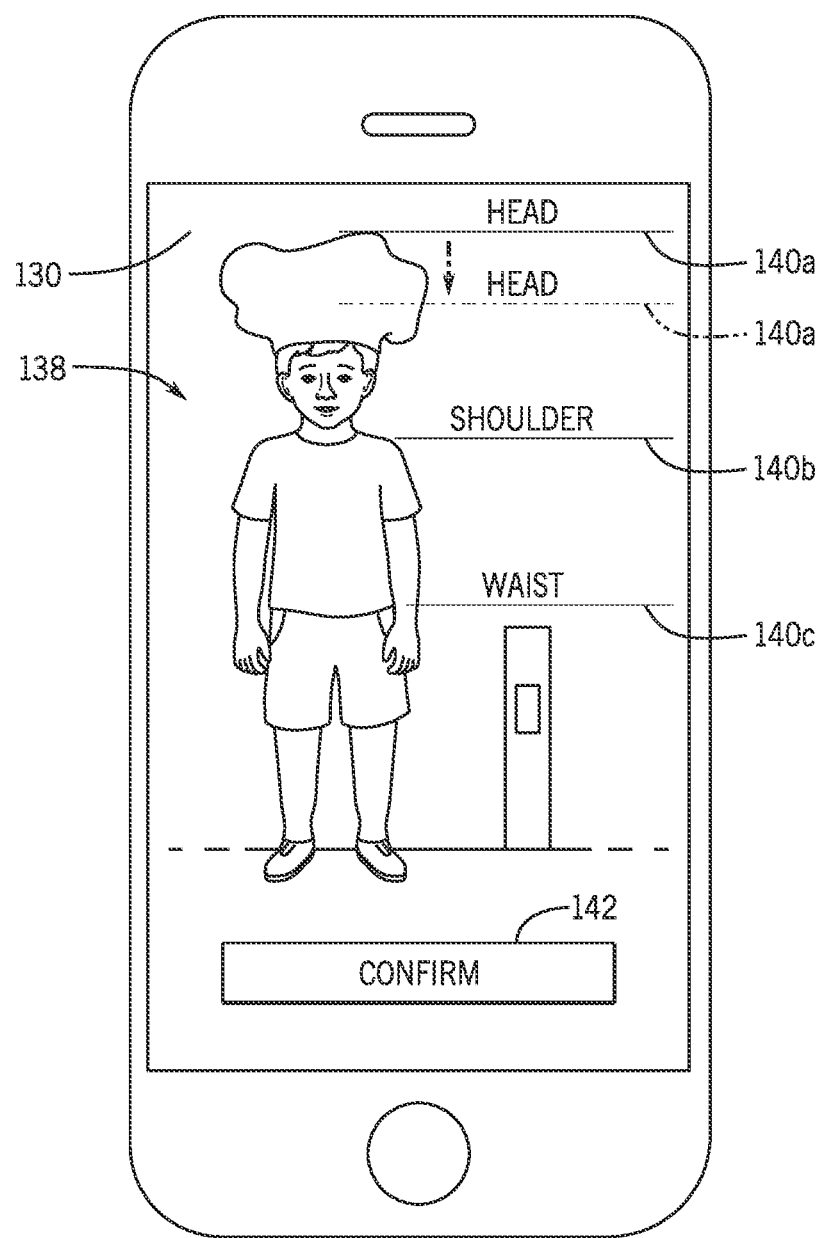
FIG. 5 is an example user interface of a guest measurement system in accordance with present embodiments.

FIG. 5 shown an example user interface of the system 12 in which the top of head marker 140a is incorrectly positioned at the top of the guest hat rather than at a location that generally corresponds with the top of the guest's head. The operator can click the edit key 144 to permit manual repositioning of the top of head marker 140a. The repositioning can be responsive to various guest inputs, such as via dragging, arrow down, hand or gaze gestures, or voice commands. Once the anatomical feature markers 140 are all correctly positioned, the operator can select the confirm key 142 to instruct the system 12 to proceed with guest height calculation.

In an embodiment, the method 100 may include machine learning features using a training set of validated measurements. In one example, the training set may generate validated measurements use a height measurement from an alternative method. The alternative measured height for a particular individual can be used to train the system to adjust the marker positioning on an image of the individual until the generated height calculation, using the markers, would output the correct height that matches the height from the alternative method. In an embodiment, the machine learning model can be used to train the feature identifier to more accurately identify the anatomical features and/or position the markers in the image. Further, the machine learning model can include an assist feature to help an operator reposition the markers 140. That is, the machine learning model can be used to identify if an operator is providing accurate input to reposition the marker and generate a displayed indicator that the marker positioning may be inaccurate or may trigger a check before submission.

Figure 6:
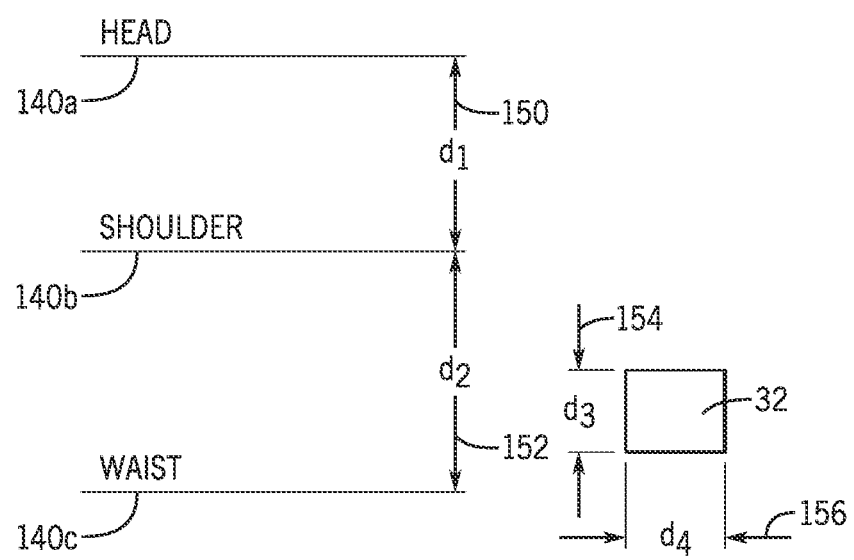
FIG. 6 is a schematic illustration of measurements from virtual space of a guest measurement system that are mapped into real space in accordance with present embodiments.

FIG. 6 is a schematic illustration of measured virtual space distances that can be scaled as provided herein. For example, using the confirmed anatomical features (or, in embodiments, portions of the overlaid markers 140), image distances 150, 152 can be determined between these identified features. Further, image dimensions of the reference marker 32 can be determined. In the illustrated example, the reference marker 32 has a generally rectangular shape and includes a height dimension 154 and a width dimension 156. Because the reference marker 32 is a real-world object with fixed real-world dimensions, the real-world dimensions can be used as a scaling factor to generate real-world values corresponding to the distances 150, 152 between the identified anatomical features. In an embodiment, the virtual space may be arbitrary or relative units. For example, the distances 150, 152 may be determined to be relative values based on the virtual dimensions 154, 156. In one example, the shoulder-waist distance 152 may be determined to be a 3× multiple of the height dimension 154. Thus, the scaling factor used is 3 to determine the real-world distance between the shoulder and waist of the guest.

While the illustrated example shows head, should, and waist anatomical features, more or fewer anatomical features may be identified. To determine a final total height calculation based on real-world scaled distances between these identified anatomical features, an anatomical model may be used. Thus, the guest height may be a function of a typical range of heights for individuals having the same shoulder to waist, shoulder to head, and waist to head distances as measured. Further, the system 12 may incorporate feedback and machine learning to improve guest measurement calculations.

Figure 7:
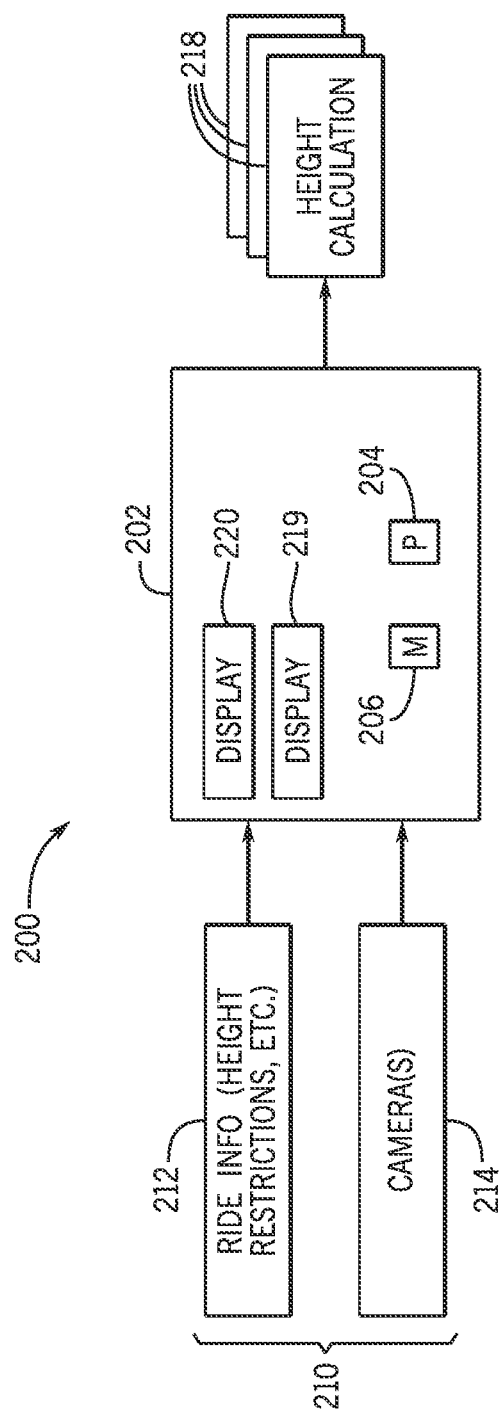
FIG. 7 is a block diagram of a guest measurement system in accordance with present embodiments.

FIG. 7 is a block diagram of a guest measurement system 200 (e.g., the guest measurement system 12) in accordance with present embodiments. The guest measurement system 200 includes a controller 202 that may be implemented in a computing device, a server, a distributed processor, or a cloud-computing environment. The controller 202 includes a processor 204 and a memory 206. The processor 204 may include one or more processing devices (processing or computing circuitry), and the memory 206 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 204 or by other processor-based devices (e.g., mobile devices). The controller 202 may utilize one or more types of software-based instructions executable by the processor 204. For example, the instructions may include accessing stored information, such as real-world features of the reference marker 32. Association techniques may be used to find relationship between variables. In one embodiment, the system 200 can use a relationship between one or more features of the reference marker 32 in the image data to identify a correct scaling factor to scale distances in the image data to real-world space.

The system 200 may receive various inputs 210 in order to generate a guest height indication and perform other actions based on estimated guest height. For example, the system 200 may receive ride information 212, including height restrictions for a particular ride. The ride information 212 may include a number of available seats, a number of seats that can accommodate guests in an assisted mobility vehicle, restrictions about which types of assisted mobility vehicles are suitable for the particular ride, height restrictions, and weight restrictions, among others. For example, the ride may have particular height or weight limitations. Additionally, certain ride seats may only accommodate a certain depth for a passenger, and thus, a guest with certain disability equipment (e.g., a cane, a wheelchair, etc.) may not be able to go on the ride, may require the use of an additional seat (e.g., adjacent seats), or may require a particular seat on the ride that is suitable for the guest.

The system 200 receives image data from one or more cameras 214. The one or more cameras 214 may include visible light cameras or cameras that detect non-visible light. The one or more cameras 214 may include an infrared camera and a RGB camera in order to obtain a guest's measurements.

The system 200 may use uses various mathematical equations and relationships (e.g., geometry, a 3D Pythagorean theorem, linear interpolation) between virtual space and real-world space in order to scale between virtual space and real-world space. In order to determine the guest height, the controller 202 may perform a calibration to scale to a measurement obtained by the one or more cameras 214 using measured dimensions of the reference marker. The controller 202 determines the height calculation 218 for measured guest using the scaling. The controller 202 may output the overall height calculation to determine whether the ride has sufficient space to accommodate the guest while the guest remains seated or assisted by the guest's assistive equipment (e.g., in the guest's wheelchair, assisted mobility device, stroller) without requiring the guest to disembark from the guest's assistive equipment. In an embodiment, the output may include a notification regarding eligibility to ride a particular attraction based on the estimated height.

The controller 202 may be communicatively coupled to a display 219 that can display the height calculation 218. In an embodiment, the controller 202 can receive user inputs 220, e.g., via capacitive sensors integrated into the display 219. The estimated height for the guest may be output to the display 219 in order to let the park employee know whether the guest 22 can be accommodated on the ride.

In certain embodiments, the disclosed guest measurement system 200 may use facial recognition or other guest tracking techniques to correlate a guest to a measured height. Thus, the guest may be measured at an earlier point in the day, and the estimated height logged to the guest profile. Using guest recognition techniques, the recognized guest can be associated with their estimated height using the guest profile at other attractions to determine ride eligibility. In this manner, the measurement need only occur once during the day.

Figure 8:
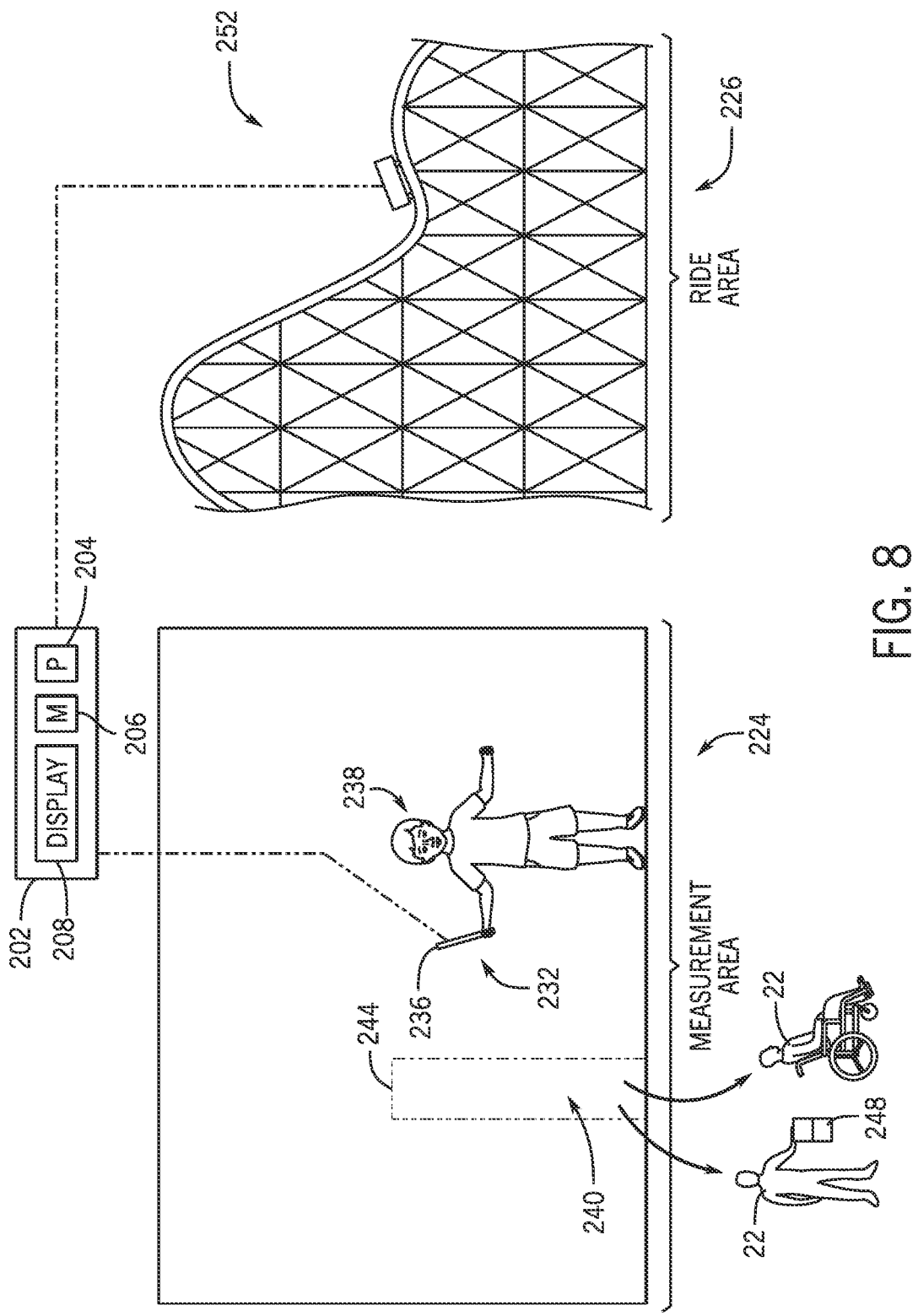
FIG. 8 is a schematic view of an attraction measurement area of the amusement park utilizing the guest measurement system in accordance with present embodiments.

FIG. 8 is a schematic of a side view of an attraction measurement area of the theme park utilizing the guest measurement system 200 of FIG. 7 in accordance with present embodiments. In the illustrated embodiment, the guest 22 is able to be measured in the attraction measurement area 224 that can be adjacent to the ride area 226 or can be part of a guest services space so that the guest is measured one time, e.g., as part of entrance processing. The attraction measurement area may include one or more cameras 232 within the attraction measurement area 220. The one or more sensors 232 can be moved via a motor 234 that is communicatively coupled to a controller 202 in order to adequately capture the image data. Additionally or alternatively, the one or more sensors 232 can be disposed in a hand-held device 236 (e.g., a wand, a tablet, or a mobile device). The hand-held device 236 may be used by a park employee 238 to capture the image data when the hand-held device 236 is positioned in front of the guest 22.

It may be appreciated that the guest 22 may be asked to move into a space 240 so that the guest 22 may be measured. The space 240 may include a reference marker 244. The space 240 may be an area where the space 240 can be readily viewed via the one or more camera 232 of the hand-held device 236 held by the park employee. The reference marker 244 may be a particular marker or a prop with image resolvable features that is in the plane of the space 240. The reference marker 244 may be disposed substantially parallel to the guest measurement space 240. When the guest 22 is determined to be in position, the height measurement can be initiated. In certain embodiments, the capturing of the reference marker initiates guest height measurement or. That is, the cameras 232 pick up the reference marker to activate guest measurement features of the system 200.

In embodiments, the sensors 232 are housed in the hand-held device 236, which may be a mobile device or tablet, and an operator activates the sensors 232 via interaction with a user interface of the mobile device or tablet. In an embodiment, the features of the controller 200 are also housed within the hand-held device 236. In other embodiments, the hand-held device 236 communicates wirelessly with the system 200, and the image data is communicated to a remote or separate system processor 204 that performs the guest height calculations based on the communicated image data. In other embodiments, the guest measurement may be performed using separate fixed-location cameras or cameras positioned within a kiosk location in the guest measurement area 220.

It may be appreciated that the guest measurement system 200 may be used to measure the guests 22 that are in a wheelchair, an assisted mobility device, a stroller, a cart, and so forth, or any time the guest 22 is holding an accessory 248 (e.g., a cane, a shopping bag, a purse) that may partially obstruct the view of the guest 22. In the illustrated embodiment, the guest measurement system 200 may be used to measure the guest 22 in a wheelchair. When the guest 22 is in a wheelchair or a stroller, it may be appreciated that a portion of the guest's body may be obstructed from view of the one or more cameras 232. For example, a view of the guest's left leg may be obstructed by a component of the wheelchair. In this instance, the one or more cameras 232 may be unable to adequately capture the dimensions of the guest's left leg. However, as discussed herein, the operator 238 may provide locations of the anatomical features via user input to permit the guest height calculation to proceed when feature information used in the calculation is missing or unresolvable in the image data.

In embodiments, depending on the configuration of the ride 252, the system 200 may receive updates from the ride 252 as seating configurations change or as the ride 252 is loaded. Thus, the system 200 can also determine if the guest height calculation is compatible with a particular ride 252 in its current configuration or load state. For example, if the ride 252 includes three seats for passengers below a particular height range, the system 200 can track if any of these seats are available when a guest in the permitted height range presents for measurement.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under U.S.C. 112(f). However, for any claims containing elements designated in any other manner, it is intended that such elements are not to be interpreted under 35 U.S.C. 112(f).

The invention claimed is:

1. A guest measurement system, comprising:
    one or more cameras configured to generate image data indicative of guest characteristics in an attraction measurement area of an individual attraction within an amusement park, wherein the image data comprises an image of a reference marker in the attraction measurement area;
    a controller configured to receive the image data indicative of the guest characteristics from the one or more cameras, the controller comprising a processor configured to:
        cause display of the image on a graphical user interface;
        identify anatomical features of the guest in the image data;
        identify the reference marker in the image data;
        generate indicators of the identified anatomical features overlaid on the displayed image;
        receive user input, via the graphical user interface, adjusting one or more positions of the indicators on displayed image relative to the identified anatomical features;
        generate updated identified anatomical features based on the user input;
        scale distances between the updated identified anatomical features in the image data from a virtual space of the image data to a real-world space using the reference marker in the image data; and
        generate a guest height calculation based on the scaled distances between the updated identified anatomical features.

2. The guest measurement system of claim 1, wherein the one or more cameras are coupled to a portable user device.

3. The guest measurement system of claim 2, wherein the portable user device is a tablet or mobile device.

4. The guest measurement system of claim 2, wherein the graphical user interface is configured to:
    receive a second user input confirming that the indicators are at locations corresponding to the identified anatomical features after the updating; and wherein the processor is configured to generate the guest height calculation responsive to receiving the second user input.

5. The guest measurement system of claim 1, wherein the identified guest anatomical features comprise a head, a shoulder, and a hip.

6. The guest measurement system of claim 5, wherein the processor is configured to:
    identify a floor or ground in the image data; and
    use a location of the floor or ground to determine the guest height calculation.

7. The guest measurement system of claim 1, wherein the processor is configured to:
    access real-world measurements of the reference marker; and
    using a relationship between features of the reference marker in the image data and the real-world measurements of the reference marker to generate a scaling function; and
    scale the distances between the identified anatomical features in the image data to the real-world space using the scaling function.

8. The guest measurement system of claim 7, wherein the real-world measurements represent a planar section of the reference marker, wherein the planar section corresponds to a plane of the image data.

9. The guest measurement system of claim 1, wherein the reference marker is a QR code.

10. The guest measurement system of claim 1, wherein the identified anatomical features comprise a top of head position of the guest in the image and wherein the updated identified anatomical features comprise an adjusted top of head position.

11. The guest measurement system of claim 10, wherein the adjusted top of head position is lower or higher than the top of head position.

12. The guest measurement system of claim 1, wherein the indicators align with respective identified anatomical features in the image.

13. A method of measuring a guest in an attraction measurement area comprising:
- receiving image data indicative of guest characteristics from one or more cameras;
- displaying the image on a graphical user interface;
- identifying anatomical features of the guest in the image data;
- identifying a reference marker in the image data;
- generating indicators of the identified anatomical features overlaid on the displayed image;
- receiving user input, via the graphical user interface, adjusting one or more positions of the indicators on displayed image relative to the identified anatomical features;
- generating updated identified anatomical features based on the user input;
- scaling distances between the updated identified anatomical features in the image data from a virtual space of the image data to a real-world space using the reference marker in the image data; and
- generating a guest height calculation based on the scaled distances between the updated identified anatomical features.

14. The method of claim 13, further comprising accessing real-world measurements of the reference marker and using the real-world measurements and features of the reference marker in the image data to generate a scaling function.

15. The method of claim 14, wherein scaling the distances comprises using the scaling function.

16. The method of claim 13, further comprising displaying the guest height calculation.

17. The method of claim 13, determining an eligibility of the guest for an attraction of an amusement park based on the guest height calculation.

18. A guest measurement device, comprising:
- one or more cameras configured to generate sensor signals comprising image data indicative of guest characteristics in an attraction measurement area of an individual attraction within an amusement park;
- a controller configured to receive the sensor signals indicative of the guest characteristics from the one or more cameras, the controller comprising a processor configured to:
  - cause display of the image on a graphical user interface;
  - identify anatomical features of the guest in the image data;
  - identify a reference marker in the image data;
  - generate indicators of the identified anatomical features overlaid on the displayed image;
  - receive user input, via the graphical user interface, adjusting one or more positions of the indicators on displayed image relative to the identified anatomical features;
  - generate updated identified anatomical features based on the user input;
  - scale distances between the updated identified anatomical features in the image data from a virtual space of the image data to a real-world space using the reference marker in the image data; and
  - generate a guest height calculation based on the scaled distances between the updated identified anatomical features; and
- a display configured to display an indication of the guest height calculation.

19. The guest measurement device of claim 18, wherein the graphical user interface is configured to:
- receive a second user input confirming locations of the indicators after updating the location, wherein the scaled distances between the identified anatomical features in the image data are based on distances between the confirmed locations.

20. The guest measurement device of claim 19, wherein the user input drags at least one of the indicators to the updated location.

* * * * *